(12) United States Patent
Dooley et al.

(10) Patent No.: US 6,646,603 B2
(45) Date of Patent: Nov. 11, 2003

(54) METHOD OF PROVIDING AN ESTIMATE OF A LOCATION

(75) Inventors: Saul R. Dooley, Reigate (GB); Martin S. Wilcox, Reigate (GB); Andrew T. Yule, Felbridge (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/882,083

(22) Filed: Jun. 15, 2001

(65) Prior Publication Data
US 2002/0008662 A1 Jan. 24, 2002

(30) Foreign Application Priority Data
Jun. 16, 2000 (GB) .............................. 0014719

(51) Int. Cl.$^7$ .............................. G01S 3/02; G01S 5/14
(52) U.S. Cl. ................... 342/458; 342/457; 342/464; 342/357.08
(58) Field of Search ............... 342/357.1, 357.03, 342/458, 453, 357.08, 357.09, 357.17, 357.02, 464, 463, 357.06; 701/213

(56) References Cited

U.S. PATENT DOCUMENTS

| | | | |
|---|---|---|---|
| 5,451,964 A | * | 9/1995 | Babu ...................... 342/357.06 |
| 5,621,793 A | | 4/1997 | Bednarek et al. ............. 380/20 |
| 5,686,924 A | | 11/1997 | Trimble et al. .............. 342/357 |
| 5,841,026 A | * | 11/1998 | Kirk et al. ................. 73/178 R |
| 5,841,396 A | | 11/1998 | Krasner ....................... 342/357 |
| 5,874,914 A | | 2/1999 | Krasner ....................... 342/357 |
| 6,043,777 A | * | 3/2000 | Bergman et al. ........ 342/357.09 |
| 6,049,304 A | * | 4/2000 | Rudel et al. ........... 342/357.08 |
| 6,275,707 B1 | * | 8/2001 | Reed et al. .................. 455/456 |

FOREIGN PATENT DOCUMENTS

| | | |
|---|---|---|
| EP | 0957370 A1 | 11/1999 |
| WO | 9726718 A1 | 7/1997 |
| WO | 9954753 A1 | 10/1999 |

OTHER PUBLICATIONS

SAtein, Barry et al., "COTS GPS C/A COde Receivers with Pseudolites for Range PLS Applications" IEEE Plans 1990, 3/1999 pp. 191–197.*

* cited by examiner

Primary Examiner—Gregory C. Issing
(74) Attorney, Agent, or Firm—Steven R. Biren

(57) ABSTRACT

A method of providing an estimate of the location of first and second devices (MS1, MS2) comprising the steps of obtaining at least one range measurement from the first device (MS1) to a known reference point (BS1, GPS SVs); obtaining at least one range measurement from the second device (MS2) to a known reference point (BS1, GPS SVs), the second device (MS2) being located near to the first device (MS1); and calculating an estimate of the location of the devices (MS1, MS2) using range measurements obtained in respect of both the first and second devices (MS1, MS2).

26 Claims, 1 Drawing Sheet

METHOD OF PROVIDING AN ESTIMATE OF A LOCATION

FIELD OF THE INVENTION

Figure 1:
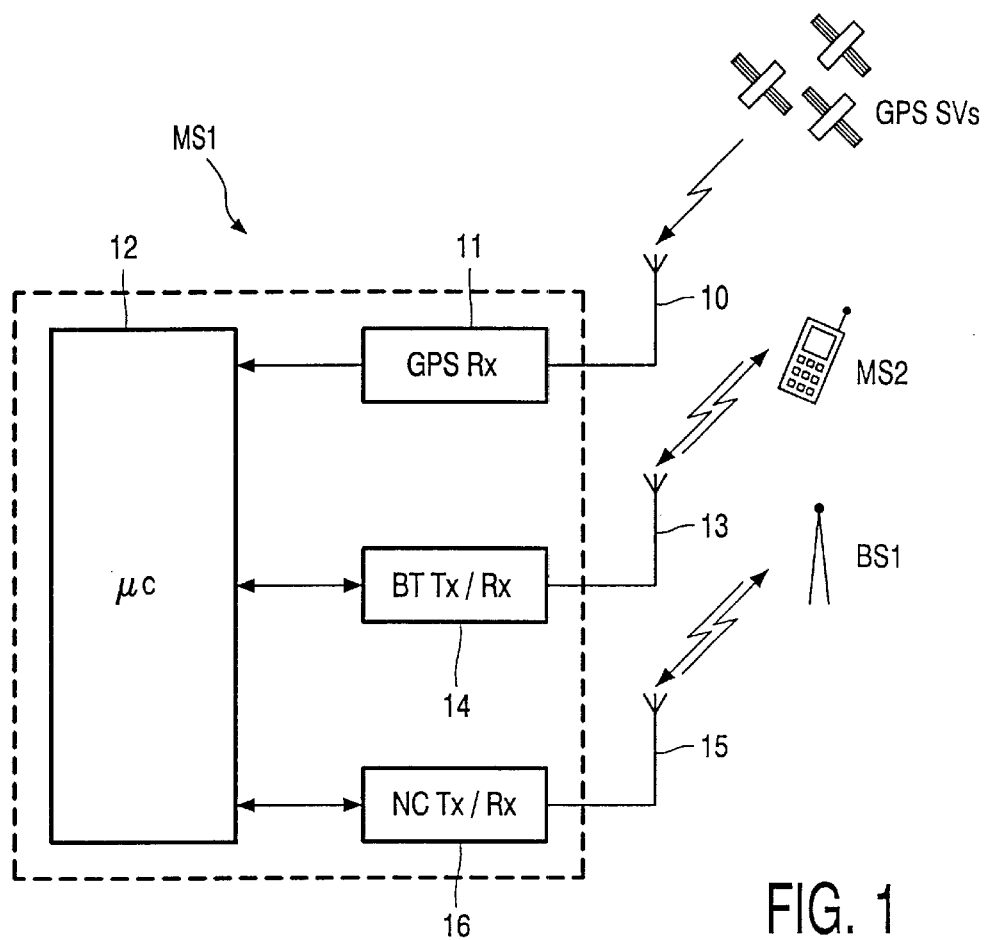

This invention relates to a method of determining the location of first and second devices.

BACKGROUND OF THE INVENTION

Recent progress in the field of GPS has enabled GPS receivers to be produced relatively cheaply leading to their widespread adoption and use. For example, one might envisage a home networking environment in which is provided a mobile telephone with GPS capability for providing its location to a cellular telephone network operator in the event of an emergency call; a TV with GPS capability for providing TV access control, say as described in U.S. Pat. No. 5,621,793; and a personal computer with GPS and Internet capability for retrieving location specific information from a web site, say a local weather report.

In such a home networking environment, three GPS receivers are provided, each returning substantially the same location. However, especially indoors, it is unlikely that all three GPS receivers will each be able to acquire the four GPS space vehicle (SV) signals normally required to obtain a position fix, or at least not all of the time. One reason for this is obscuration of the GPS signals by buildings, walls and other urban paraphernalia.

It is therefore an object of the present invention to provide a method of determining the location of a device which is more effective indoors.

SUMMARY OF INVENTION

According to a first aspect of the present invention, there is provided a method of providing an estimate of the location of first and second devices which are located near to each other, the method comprising the steps of:

obtaining at least one range measurement from the first device to a corresponding reference point;

obtaining at least one range measurement from the second device to a corresponding reference point: and calculating an estimate of the location of the devices using range measurements obtained with respect to both the first and second devices, and wherein at least one range measurement obtained from the second device was obtained with respect to a reference point to which no range measurements were obtained from the first device.

Such a method enables an estimate of the location of the devices to be calculated in circumstances where it is impossible to unambiguously determine the location of the first device, or the location of the second device using only range measurements obtained from the second device.

In particular, but not exclusively, the or each range measurement obtained with respect to the second device and for each such range measurement an indication of the associated reference point, e.g. in the form of a position co-ordinate, are provided to the first device for calculating an estimate of the location of the devices, preferably using a wireless communications link.

Where the range measurement information is provided from the second device to the first device using a short range communications link such as Bluetooth, one can safely assume that the devices are close together and that the resultant position fix is a good estimate of the true position of the first second devices. Also, having calculated an estimate of the location of the devices at the first device, the estimate may then be provided to the second device.

Preferably, the first and second devices have reciprocal functionality in that the or each range measurement obtained with respect to the first device and for each such range measurement an indication of the associated reference point may also be provided to the second device for calculating an estimate of the location of the devices.

Alternatively, the each range measurement obtained with respect to both the first an d second devices and for each such a range measurement an indication of the associated reference point may be provided to a third device for calculating an estimate of the location of the first and second devices.

At least one range measurement obtained in respect of either the first or the second device may be a pseudorange range measurement.

For example, the position determining means of the second device may include a GPS receiver wherein at least two range measurements obtained with respect to the second device are pseudorange measurements from a GPS SV. Also, the position determining means of the first device may also include a GPS receiver wherein at least two range measurements obtained with respect to the first device are pseudorange measurements from a GPS SV; and wherein at least 5 pseudorange measurements are obtained with respect to either the first or the second device in total. I.e. sufficient to obtain a position fix.

NB. In order to calculate an estimate of the location of the first device using pseudorange measurements obtained with respect to both first and second devices, clock errors of both the first and second devices must be resolved, i.e. the clock errors between the synchronized GPS SVs and each device. Fortunately, however, pseudoranges may be more conveniently obtained than absolute range measurements and this may justify the extra computation.

Alternatively, where the position determining means of the first and second device both includes a GPS receiver and the first and second device are synchronized, a single pseudorange measurement from a GPS SV obtained with respect to either the first or second device may contribute to the position determination. Without synchronicity, the benefit of a device obtaining a single pseudorange is offset by the extra clock error introduced.

At least one range measurement obtained with respect to the first and/or the second device may be a range measurement to a ground based reference point. This information may then be combined with either other ground and or space based range or pseudorange measurements in order to obtain a position fix.

For example, this may be an absolute range measurement determined by a time-of-arrival measurement with respect to a fixed base station, and may be conveniently provided when the first and/or second device is a mobile cellular telephone able to communicate using a wireless communications link which is independent of any cellular basestation network. Synchronicity between a mobile cellular telephone and the cellular telephone network basestation with which it is registered is relatively easy to achieve, and thus an absolute range measurement may be readily obtained.

Also provided in accordance with the first aspect of the present invention is a device able to provide an estimate of its location comprising ranging means for obtaining at least one range measurement from the device to a first reference point and location information of the first reference point; a receiver for receiving ranging information relating to at least one range measurement from another device, located near the device and thus essentially at the same location, to a second reference point and location information of the second reference point; and a processor for calculating an estimate of the location of the device using both of the range measurements obtained by its ranging means and from the ranging information, and wherein at least one range measurement obtained from the ranging information was obtained with respect to a reference point to which no range measurements were obtained by the ranging means.

According to a second aspect of the present invention, there is provided a method of determining the position of a first GPS receiver with the assistance of a second, portable GPS receiver comprising the steps of:

acquiring GPS signals in the first GPS receiver and deriving GPS signal information therefrom;

providing the GPS signal information from the second GPS receiver to the first GPS receiver; and acquiring GPS signals in the first GPS receiver using the GPS signal information provided by the second GPS receiver, and determining the position of the first GPS receiver therefrom.

The term "portable" is intended to mean that it could be conveniently carried from place to place by a human and would normally be carried from place to place by a human. As such, portable would include a mobile telephone, a personal digital assistant (PDA), a palm-top computer or lap-top computer, all incorporating a GPS receiver.

Preferably, the first and second GPS receivers have reciprocal functionality in that the first GPS receiver may also acquire GPS signals and derive GPS signal information therefrom, and provide GPS signal information to the second GPS receiver; and that the second GPS receiver may acquire GPS signals using the GPS signal information provided by the first GPS receiver.

Also, it is desirable that the first GPS receiver provide this assistant whilst necessarily being able to determine its own position, i.e. not be able to acquire the four GPS signals normally necessary to do so.

Also provided in accordance with the second aspect of the present invention is a GPS receiver unit 11.

Figure 2:
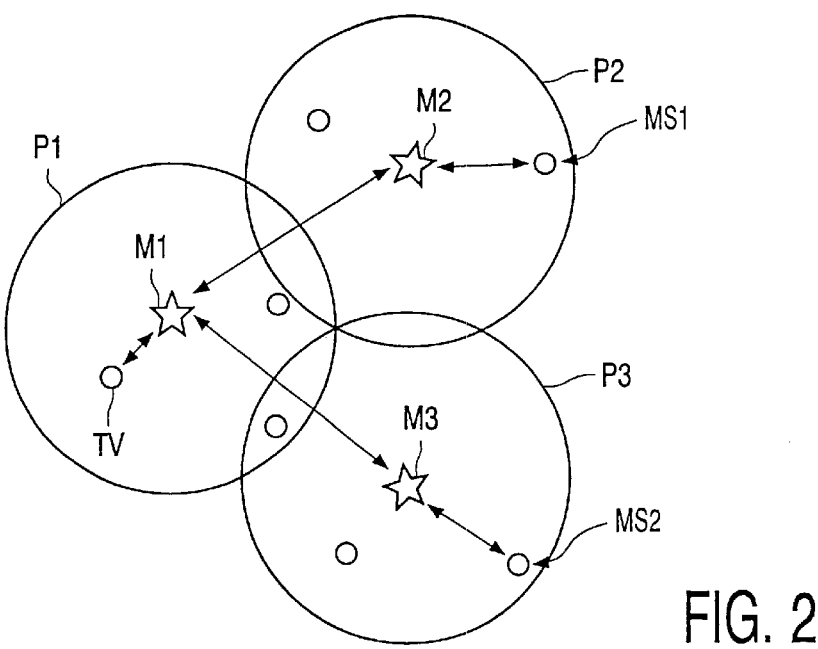

The above and other features and advantages of the present invention will be apparent from the following description, by way of example, of implementations of methods of the present invention with reference to the accompanying drawing in which:

FIG. 1 shows, schematically, a pair of mobile cellular telephones MS1, MS2 each comprising a GPS receiver with an additional wireless communication capability independent of a cellular telephone network; and FIG. 2 illustrates, schematically, the interaction of the pair of mobile cellular telephones MS, MS2 of FIG. 1 in the context of adjacent piconets.

Referring to FIG. 1, mobile cellular telephone MS1 is shown comprising a communications transmitter and receiver (C Tx/Rx) 16 connected to a communications antenna 15 and controlled by a microprocessor ($\mu$c) 12 for two-way communication with a cellular telephone network base station BS1 with which it is registered.

In addition, cellular telephone MS1 comprises a GPS receiver (GPS Rx) 11 connected to a GPS antenna 10 and also controlled by the microprocessor ($\mu$c) 12 for receiving GPS spread spectrum signals transmitted from orbiting GPS satellites. When operative, the GPS receiver 11 receives NAVSTAR SPS GPS signals through the GPS antenna 10 and pre-processes them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the microprocessor 12. The GPS signals may then be acquired and tracked for the purpose of deriving pseudorange information. Of course, such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House.

Cellular telephone MS1 also comprises a Bluetooth communications transmitter and receiver (BT Tx/Rx) 14 connected to a Bluetooth communications antenna 13 and controlled by the microprocessor ($\mu$c) 12 for short range, two-way Bluetooth communication. As illustrated in FIG. 1, such communication may be with another mobile cellular telephone MS2 and independent from the cellular telephone network. Cellular telephone MS2 is substantially identical to cellular telephone MS1.

Consider the scenario where cellular telephone MS1 is required to determine its position, say to provide its location to the emergency services operator (termed public safety answer point in the US) in the event of an emergency call, but its GPS receiver 12 is only able to acquire two of the four GPS signals required to provide an unambiguous position fix. In such a scenario, using its Bluetooth communication transmitter (BT Tx) 14, cellular telephone MS1 broadcasts a request to other Bluetooth receivers in the vicinity requesting that they respond by providing supplemental ranging information. Cellular telephone MS2 located nearby receives the request and at the time of the request is able to see two GPS satellites, both different from those acquired by cellular telephone MS1, and from them take pseudorange measurements. Also, cellular telephone MS2 is able to make an absolute range measurement using a time-of-arrival technique with the base station with which it is registered.

In response to the request from cellular telephone MS1, cellular telephone MS2 replies by sending its ranging information together with corresponding reference locations in co-ordinate form. The reference information for GPS pseudoranges, i.e. the position of the GPS SVs, may be derived from GPS data message and the position of the base station from which the absolute range measurement from cellular telephone MS2 is made may be transmitted from the base station to cellular telephone MS2 prior to its inclusion in the reply by cellular telephone MS2 to cellular telephone MS1. Upon receiving the reply, cellular telephone MS1 then has addition ranging information available to it to supplement its own, as summarised in Table 1 below.

TABLE 1

Ranging information available to cellular telephone MS1

| Device | Information (with reference location) | Unknowns |
| --- | --- | --- |
| MS1 | Pseudorange from GPS satellite to MS1 | Clock error 1 |
| MS1 | Pseudorange from GPS satellite to MS1 | Clock error 1 |
| MS2 | Pseudorange from GPS satellite to MS2 | Clock error 2 |
| MS2 | Pseudorange from GPS satellite to MS2 | Clock error 2 |
| MS2 | Absolute range measurement | — |

As there are three unknown co-ordinates of the position estimate, i.e. x, y and z, and two clock errors totalling 5 unknowns; and as there are 5 independent ranges/pseudoranges, it is possible for cellular telephone MS1 to determine its location. Of course, this position estimate is equally applicable to MS2 and may be provided to MS2 using the Bluetooth link.

Referring to FIG. 2, the pair of mobile cellular telephones MS1, MS2 of FIG. 1 in the context of adjacent wireless piconets P1, P2, P3. I.e. wireless networks of devices in each of which one device is designated a masters M1, M2 and M3 (denoted by stars) and is able to communicate with slave devices (denoted by small circles) within its piconet. Each master is capable of communication with other master devices in adjacent piconets.

For example, a television TV in piconet P1 without any means to determine its own position may communicate with its master M1, for example a personal computer, and requests that it receive an approximate position fix. This may be in order to effect TV access control whereby only when the present location is consistent with an authorised location are the incoming video signals decrypted and displayed.

Upon receiving said request, master M1 communications with masters M2, M3 of adjacent piconets requesting that they broadcast across their respective piconets requests for ranging information of the aforementioned kind. Cellular telephones MS1, MS2 located within piconets P2 and P3 respectively receive such a request and transmit their ranging information to master M1 via their respective masters M2 and M3. Master device M1 calculates a position fix using the ranging information supplied by MS1 and MS2, and transmits this information to the TV within its piconet so as to enable the TV to effect access control. I.e. the TV uses an estimate of the position of cellular telephones MS1 and MS2 as an estimate of its own position. In this example, the position calculation is done at the master M1 which may itself be without any means to provide a range measurement. If either MS1 or MS2 were individually able to determine their position, this position estimate could be provided via respective masters and master M1 to the television.

In order to reduce the time to first fix, a GPS receiver of either or both cellular telephones MS1 and MS2 may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in relation to a fixed base station in U.S. Pat. Nos. 5,841,396 and 5,874,914 which are incorporated herein by reference.

Via the piconets, such assistance may be provided to MS1 and MS2 either between each other or by a further device in possession of relevant information, say an up to date almanac and ephemeris data. Ideally, MS1 and MS2 are each capable of reciprocating such assistance in that one may be able to provide the other with Doppler information relating to the satellites in view, and on occasion receive and use such Doppler information provided by the other.

At present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of radio transmitters at different locations and a receiver which determines its location based on the time of arrival of the transmissions of the radio transmitters. In so far as a telephone is concerned, this would also include base station triangulation in which timing measurements were taken by the base stations and relayed back to the mobile telephone.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A method of providing an estimate of the location of first and second devices which are located near each other and are thus essentially at the same location , the method comprising the steps of:

obtaining at least one range measurement from the first device to a first reference point and location information with regard to the first reference point;

obtaining at least one range measurement from the second device to a second reference point and location information with regard to the second reference point;

resolving clock errors of the first and second devices; and calculating an estimate of the location of the devices using both of the range measurements obtained with respect to the first and second devices, wherein at least one range measurement obtained from the second device was obtained with respect to a reference point from which no range measurements were obtained from the first device.

2. A method according to claim 1 wherein the or each range measurement obtained with respect to the second device and for each such range measurement an indication of the associated reference point are provided to the first device for calculating an estimate of the location of the devices.

3. A method according to claim 2 wherein the or each range measurement obtained with respect to the second device and for each such range measurement an indication of the associated reference point are provided to the first device using a wireless communications link.

4. A method according to claim 2 wherein the estimate of the location of the device is provided from the first device to the second device.

5. A method according to claim 2 wherein the or each range measurement obtained with respect to the first device and for each such range measurement an indication of the associated reference point are provided to the second device for calculating an estimate of the location of the devices.

6. A method according to claim 1 wherein the or each range measurement obtained with respect to both the first and second devices and for each such range measurement an indication of the associated reference point are provided to a third device for calculating an estimate of the location of the first and second devices.

7. A method according to claim 1 wherein it is impossible to unambiguously determine the location of the first device using only range measurements obtained from the first device.

8. A method according to claim 1 wherein it is impossible to unambiguously determine the location of the second device using only range measurements obtained from the second device.

9. A method according to claim 1 wherein at least one range measurement obtained with respect to either the first or the second device is a pseudorange measurement.

10. A method according to claim 9 wherein the position determining means of the second device includes a GPS receiver; and wherein at least two range measurements obtained with respect to the second device are pseudorange measurements from a GPS SV.

11. A method according to claim 10 wherein the position determining means of the first device also includes a GPS receiver; wherein at least two range measurements obtained with respect to the first device are pseudorange measurements from a GPS SV; and wherein at least 5 pseudorange measurements are obtained with respect to either the first or the second device in total.

12. A method according to claim 10 wherein in order to calculate an estimate of the location of the first device using pseudorange measurements obtained with respect to both first and second devices, clock errors of both the first and second devices are resolved.

13. A method according to claim 9 wherein the position determining means of the first and second device both include a GPS receiver; wherein a single range measurement obtained with respect to either the first or second device is a pseudorange measurement from a GPS space vehicle (SV); and wherein the first and second devices are synchronized.

14. A method according to claim 1 wherein at least one range measurement obtained with respect to either the first or the second device is a range measurement to a ground based reference point.

15. A method according to claim 14 wherein at least one range measurement obtained with respect to the first and/or the second device is an absolute range measurement determined by a time-of-arrival measurement with respect to a fixed base station.

16. A method according to claim 15 wherein the first and/or the second device is a mobile cellular telephone able to communicate directly with the other device using a wireless communications link which is independent of any cellular basestation network; and wherein the time-of-arrival measurement is provided from the mobile cellular telephone and a cellular telephone network basestation.

17. A method according to claim 1 wherein for at least one range measurement, indication of the associated reference point is in the form of a position co-ordinate.

18. A device able to provide an estimate of its location comprising ranging means for obtaining at least one range measurement from the device to a first reference point and location information of the first reference point; a receiver for receiving ranging information relating to at least one range measurement from another device, located near the device and thus essentially at the same location, to a second reference point and location information of the second reference point; and a processor for resolving clock errors of the first and second devices and calculating an estimate of the location of the device using both of the range measurements obtained by its ranging means and from the ranging information, and wherein at least one range measurement obtained from the ranging information was obtained with respect to a reference point to which no range measurements were obtained by the ranging means.

19. A device according to claim 18 further comprising a transmitter for transmitting the estimate of the location of the device to the other device located nearby.

20. A device according to claim 18 further comprising a transmitter wherein upon receiving a request for ranging information from another device located nearby the device transmits its range measurements together with an indication of the associated reference point to the requesting device.

21. A device according to claim 18 wherein the ranging means is adapted to obtaining at least one pseudorange measurement.

22. A device according to claim 21 wherein the processor is adapted to calculate an estimate of the location of the device using pseudorange measurements obtained by both its ranging means and from the ranging information.

23. A device according to claim 22 wherein the processor is adapted to resolve clocks errors associated with pseudorange measurements obtained by both its ranging means and from the ranging information.

24. A device according to claim 18 wherein the ranging means includes a GPS receiver.

25. A device according to claim 18 in the form of a mobile cellular telephone able to communicate directly with the another device located nearby using a wireless communications link which is independent of any cellular basestation network.

26. A device according to claim 25 wherein the cellular telephone is adapted to provide a time-of-arrival measurement from the mobile cellular telephone to a cellular telephone network basestation.

* * * * *